US012583303B2

(12) United States Patent
Dunn et al.

(10) Patent No.: US 12,583,303 B2
(45) Date of Patent: Mar. 24, 2026

(54) BULKHEAD FITTING ASSEMBLY

(71) Applicant: Rivian IP Holdings, LLC, Irvine, CA (US)

(72) Inventors: Casey Dunn, Mission Viejo, CA (US); Brandon Thayer, Aliso Viejo, CA (US); Fwutsai Kuo, Laguna Hills, CA (US); Ryan Arens, Hillard, OH (US)

(73) Assignee: Rivian IP Holdings, LLC, Irvine, CA (US)

( * ) Notice: Subject to any disclaimer, the term of this patent is extended or adjusted under 35 U.S.C. 154(b) by 862 days.

(21) Appl. No.: 17/703,058

(22) Filed: Mar. 24, 2022

(65) Prior Publication Data

US 2023/0311630 A1 Oct. 5, 2023

(51) Int. Cl.
| | |
|---|---|
| *F16L 47/26* | (2006.01) |
| *B60K 1/04* | (2019.01) |
| *F16L 41/08* | (2006.01) |
| *H01M 10/613* | (2014.01) |
| *H01M 10/625* | (2014.01) |
| *H01M 10/6552* | (2014.01) |
| *B60K 1/00* | (2006.01) |

(52) U.S. Cl.
CPC ............... B60K 1/04 (2013.01); F16L 41/08 (2013.01); F16L 47/26 (2013.01); H01M 10/613 (2015.04); H01M 10/625 (2015.04); H01M 10/6552 (2015.04); B60K 2001/005 (2013.01)

(58) Field of Classification Search
CPC . F16L 41/08; F16L 41/086; F16L 5/02; F16L 47/26; F16L 47/28; F16L 23/162; F16L 23/0283; F16L 21/035; F16L 25/028; F16L 37/008; H01M 10/6552; H01M 10/6556
See application file for complete search history.

(56) References Cited

U.S. PATENT DOCUMENTS

| | | | | |
|---|---|---|---|---|
| 5,161,830 A | * | 11/1992 | Abe | .................... F16L 37/0985 |
| | | | | 285/317 |
| 7,497,482 B2 | * | 3/2009 | Sugiyama | ........... F16L 19/0218 |
| | | | | 285/353 |
| 8,231,142 B2 | * | 7/2012 | Olver | .................... F16L 23/167 |
| | | | | 285/142.1 |
| 10,424,820 B2 | * | 9/2019 | Kim | ................. H01M 10/6568 |
| 11,255,468 B2 | * | 2/2022 | Ishibashi | ................ F16L 23/18 |

(Continued)

FOREIGN PATENT DOCUMENTS

| | | | | |
|---|---|---|---|---|
| DE | 19507854 A1 | * | 9/1995 | ............. F16J 15/061 |

OTHER PUBLICATIONS

DE-19507854 Translation (Year: 1995).*

*Primary Examiner* — Matthew Troutman
*Assistant Examiner* — Alexander T Rufrano
(74) *Attorney, Agent, or Firm* — Foley & Lardner LLP

(57) ABSTRACT

An apparatus can include a first fitting having a first mating portion and a second fitting having a second mating portion. The first fitting can couple with a portion of a first fluid line. The first fluid line can be at least partially internal to a battery pack. The second fitting can couple with a portion of a second fluid line. The second fluid line can be at least partially external to the battery pack. The second mating portion of the second fitting can engage with the first mating portion of the first fitting to fluidly couple the first fluid line with the second fluid line.

8 Claims, 9 Drawing Sheets

(56) References Cited

U.S. PATENT DOCUMENTS 11,781,679 B2 * 10/2023 Huang ................. F28F 9/0256
                                                   285/219
12,107,248 B2 * 10/2024 Rath ................... H01M 50/207

* cited by examiner

800

805

Provide fitting

BULKHEAD FITTING ASSEMBLY

INTRODUCTION

Vehicles can include fluid lines for thermal management of various vehicle components. For example, electric vehicles can include fluid lines to maintain thermal regulation of various components of a battery of the vehicle.

SUMMARY

A serviceable fitting assembly of a vehicle, such as a bulkhead fitting assembly, can include a first fitting that can couple with a first coolant line that is at least partially inside a battery pack. The bulkhead fitting assembly can include a second fitting that can couple with a second coolant line that is at least partially outside of the battery pack. The second fitting can include a male mating portion that engages with a female mating portion of the first fitting to fluidly couple the first coolant line with the second coolant line. The first fitting and the second fitting can each couple with a portion of the battery pack either directly or indirectly. The second fitting can removably couple with the battery pack such that the second fitting can be replaced or removed from the battery pack during servicing. By having a modular fitting assembly, the second fitting can be removed from the battery pack without having to disassemble the battery pack. Thus, the fitting assembly can be serviced in a minimally invasive manner.

At least one aspect is directed to an apparatus. The apparatus can include a first fitting having a first radial seal and a first mating portion. The first fitting can couple with a portion of a first fluid line. The first fluid line can be at least partially internal to a battery pack. The apparatus can include a second fitting having a second radial seal and a second mating portion. The second fitting can couple with a portion of a second fluid line. The second fluid line can be at least partially external to the battery pack. The second mating portion of the second fitting can engage with the first mating portion of the first fitting to fluidly couple the first fluid line with the second fluid line.

At least one aspect is directed to a battery pack system. The battery pack system can include a fitting assembly. The fitting assembly can include a first fitting having a first mating portion. The first fitting can couple with a portion of a first fluid line. The first fluid line can be at least partially internal to a battery pack. The apparatus can include a second fitting having a second mating portion. The second fitting can couple with a portion of a second fluid line. The second fluid line can be at least partially external to the battery pack. The second mating portion of the second fitting can engage with the first mating portion of the first fitting to fluidly couple the first fluid line with the second fluid line.

At least one aspect is directed to a method of servicing a fitting assembly. The method can include accessing a first fitting having a first mating portion. The first fitting can couple with a portion of a first fluid line. The first fluid line can be at least partially internal to a battery pack. The method can include inserting a second mating portion of a second fitting into the first mating portion of the first fitting. The method can include coupling the second fitting with a portion of a second fluid line. The second fluid line can be at least partially external to the battery pack.

At least one aspect is directed to an electric vehicle. The electric vehicle can include a fitting assembly for a battery pack. The fitting assembly can include a first fitting having a first mating portion. The first fitting can couple with a portion of a first fluid line. The first fluid line can be at least partially internal to the battery pack. The fitting assembly can include a second fitting having a second mating portion. The second fitting can couple with a portion of a second fluid line. The second fluid line can be at least partially external to the battery pack. The second mating portion of the second fitting can engage with the first mating portion of the first fitting to fluidly couple the first fluid line with the second fluid line.

At least one aspect is directed to method. The method can include providing a fitting assembly for a battery pack. The fitting assembly can include a first fitting having a first mating portion. The first fitting can couple with a portion of a first fluid line. The first fluid line can be at least partially internal to the battery pack. The fitting assembly can include a second fitting having a second mating portion. The second fitting can couple with a portion of a second fluid line. The second fluid line can be at least partially external to the battery pack. The second mating portion of the second fitting can engage with the first mating portion of the first fitting to fluidly couple the first fluid line with the second fluid line.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of a serviceable bulkhead fitting assembly. The various concepts introduced above and discussed in greater detail below may be implemented in any of numerous ways.

The present disclosure is directed to systems and methods of servicing a bulkhead fitting assembly of a vehicle. The bulkhead fitting assembly can include an internal fitting (e.g., at least partially internal to a battery pack) to fluidly couple with a coolant line internal to the battery pack and an external fitting (e.g., at least partially external to the battery pack) to fluidly couple with a coolant line external to the battery pack. The internal fitting can include a first mating portion (e.g., a female mating portion) and the external fitting can include a second mating portion (e.g., a male mating portion) that engages with the first mating portion to fluidly couple the internal coolant line with the external coolant line. The internal fitting and the external fitting can each couple with a portion of the battery pack either directly (e.g., with a portion of the battery pack) or indirectly (e.g., with an adapter coupled with the battery pack). The external fitting can removably couple with the battery pack such that the external fitting can be replaced or removed from the battery pack as needed. The internal fitting and the external fitting can each include one or more radial seals that engage with a bore of the battery pack or a bore of the adapter to couple the fittings in a liquid-tight manner with minimal flow impendence.

The disclosed solutions have at least one technical advantage of servicing the fitting assembly. By having a modular fitting assembly (e.g., having at least two fittings), at least one fitting can be removed or replaced from the battery pack without the need to remove another fitting. For example, the second fitting (e.g., the at least partially external fitting) can be removed or replaced from the first fitting (e.g., the at least partially internal fitting) while the first fitting is coupled with a portion of the battery pack. This may reduce or eliminate the need to take apart the battery pack to remove or replace a portion of the fitting assembly (e.g., if a fitting is damaged). Thus, the technical solution provides apparatus, systems, and methods for servicing a fitting assembly in a minimally invasive manner.

Figure 1:
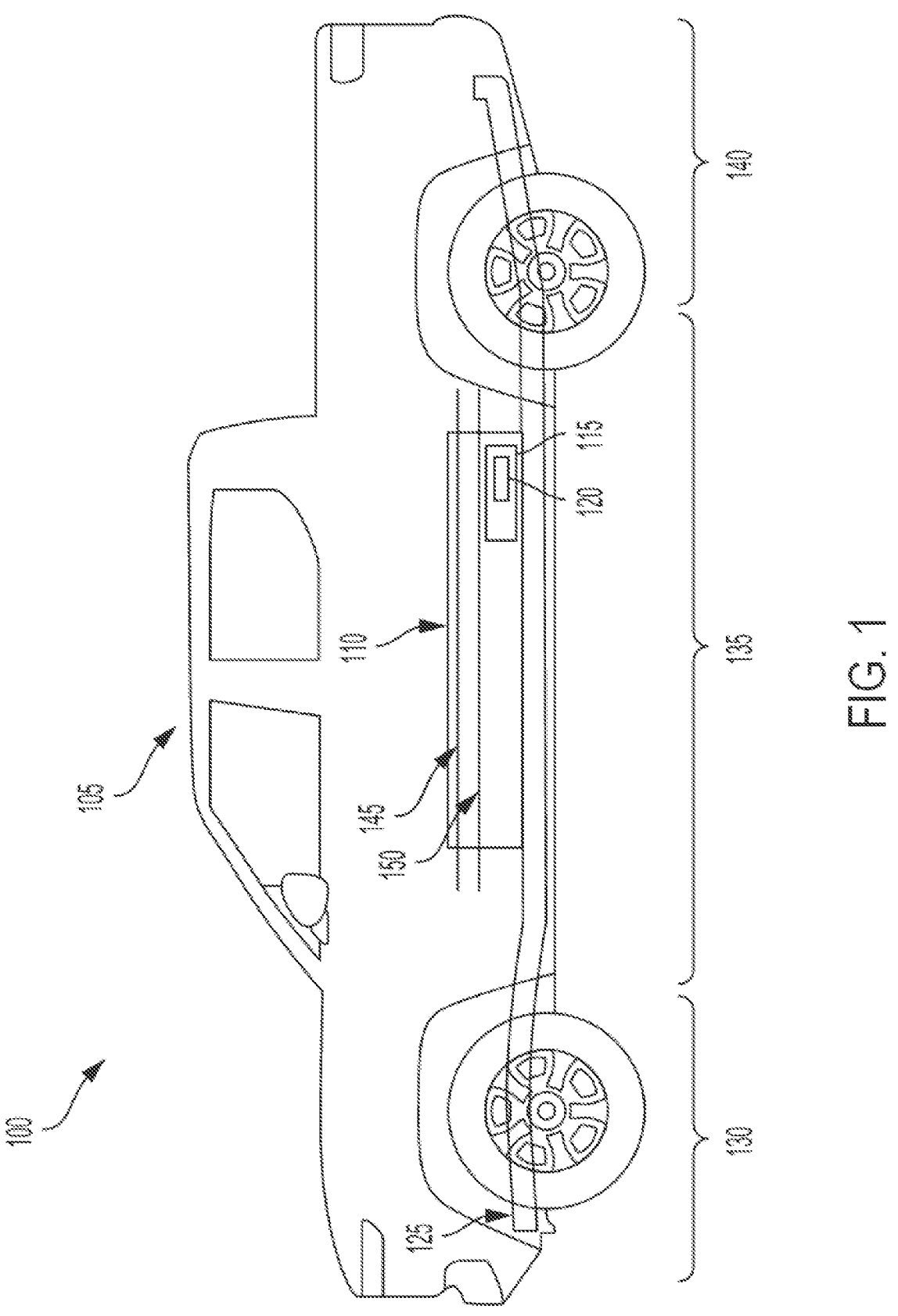
FIG. 1 depicts an example electric vehicle, in accordance with implementations.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
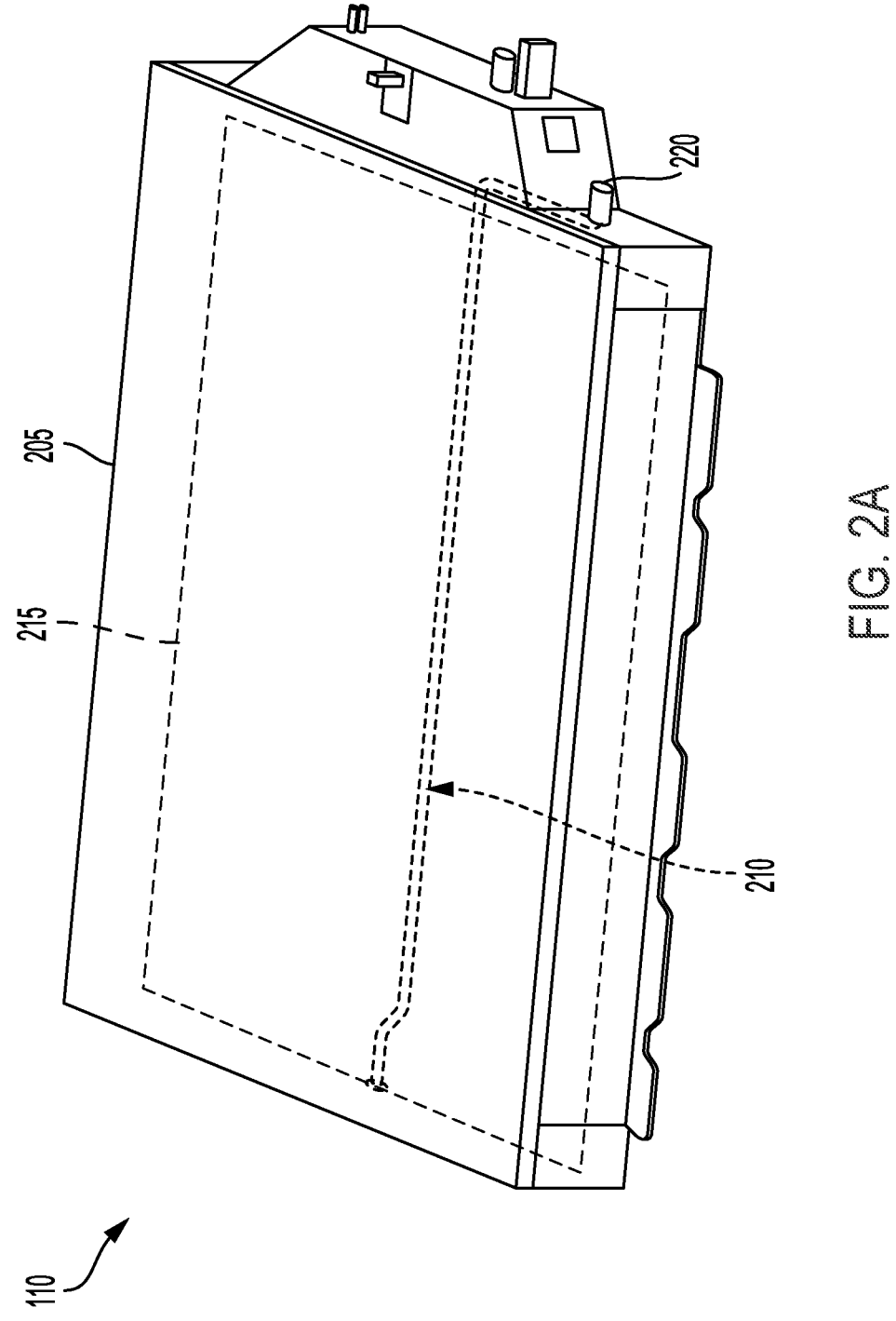
FIG. 2A depicts an example battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one cold plate 215. The cold plate 215 can be positioned in relation to a top submodule and a bottom submodule, such as in between the top and bottom submodules, among other possibilities. The battery pack 110 can include any number of cold plates 215. For example, there can be one or more cold plates 215 per battery pack 110, or per battery module 115. At least one cooling line 210 can be coupled with, part of, or independent from the cold plate 215.

Figure 2B:
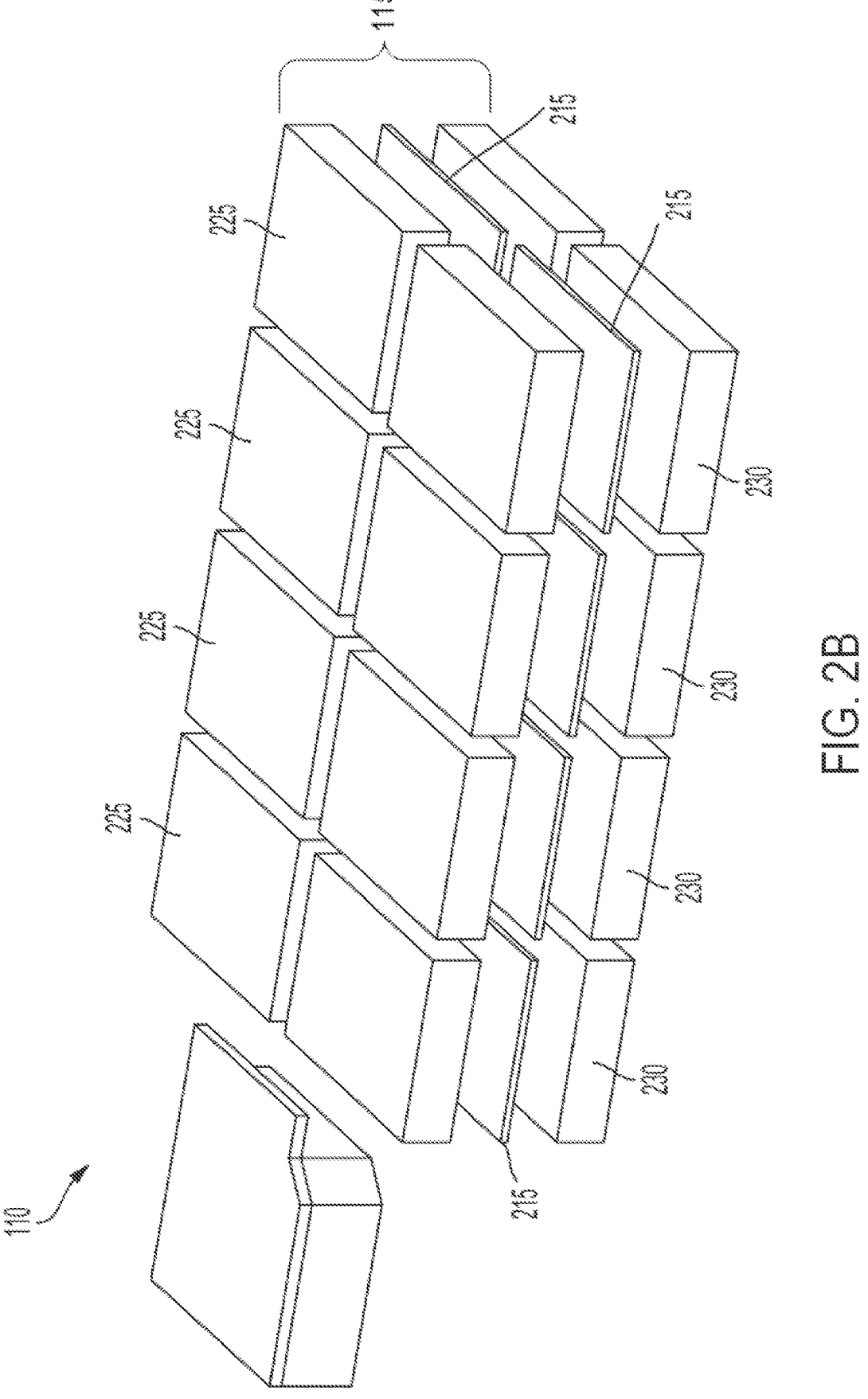
FIG. 2B depicts an example battery module, in accordance with implementations.

FIG. 2B depicts example battery modules 115. The battery modules 115 can include at least one submodule. For example, the battery modules 115 can include at least one top submodule 225 or at least one bottom submodule 230. At least one cold plate 215 can be disposed between the top submodule 225 and the bottom submodule 230. For example, one cold plate 215 can be configured for heat exchange with one battery module 115. The cold plate 215 can be disposed or thermally coupled between the top submodule 225 and the bottom submodule 230. One cold plate 215 can also be thermally coupled with more than one battery module 115 (or more than two submodules 225, 230). The battery submodules 225, 230 can collectively form one battery module 115. In some examples each submodule 225, 230 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 225 and a bottom submodule 230, possibly with a cold plate 215 in between the top submodule 225 and the bottom submodule 230. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing. The electrolyte material, e.g., an ionically conductive fluid or other material, can generate or provide electric power for the battery cell 120. A first portion of the electrolyte material can have a first polarity, and a second portion of the electrolyte material can have a second polarity. The housing can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal (e.g., a positive or anode terminal) and a second polarity terminal (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

Figure 3:
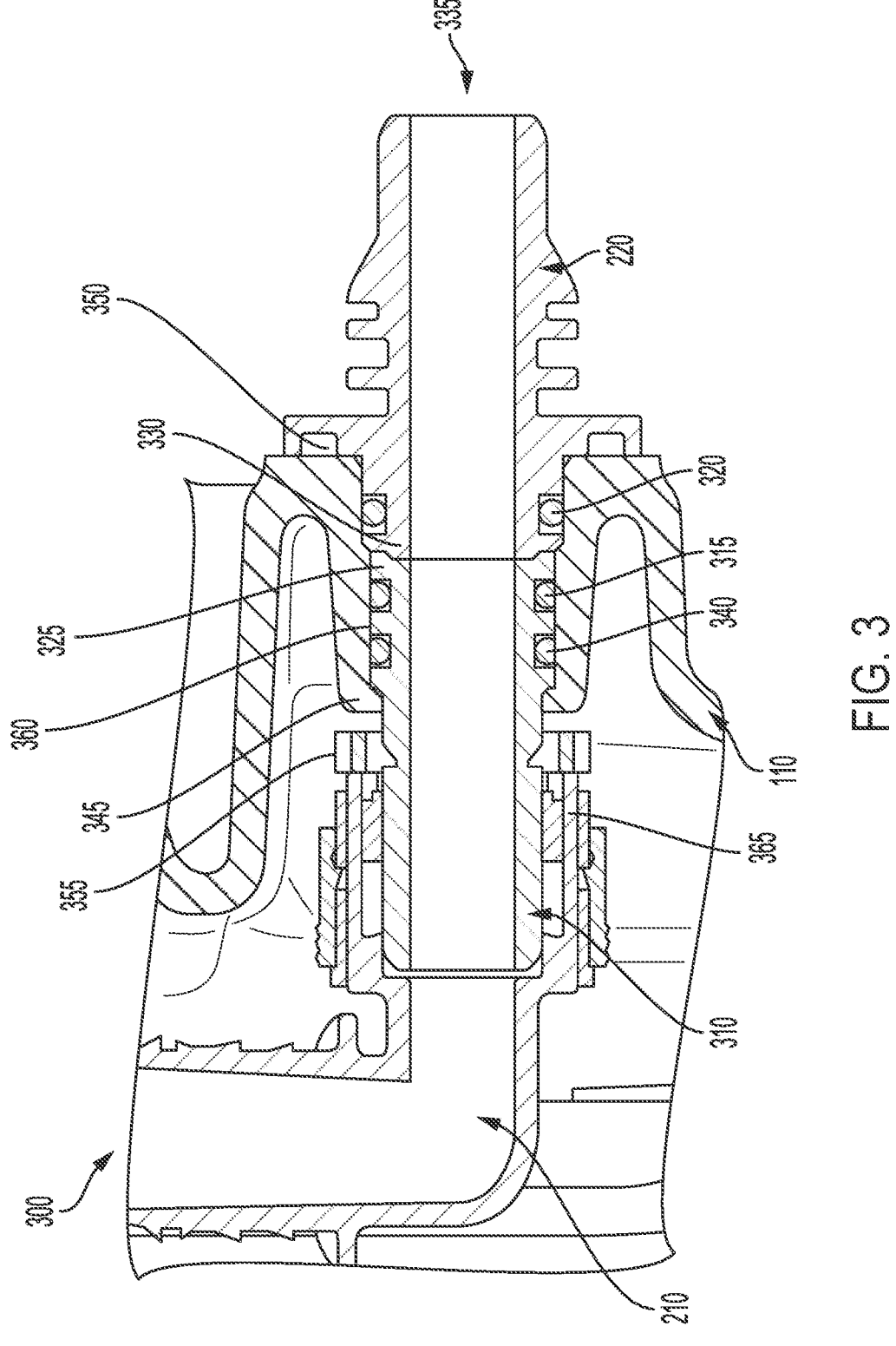
FIG. 3 depicts an example cross-sectional view of a portion of a system, in accordance with implementations.

FIG. 3 depicts an example cross-sectional view of a system 300 of the vehicle 105. For example, the system 300 (e.g., a battery pack system 300) can include one or more devices or apparatuses that facilitate coupling the at least one coolant line 210 with one or more portions of the battery pack 110. The coolant line 210 can be or can include at least one coolant fluid. For example, the battery pack system 300 can include at least one coolant fluid that is circulated throughout the battery pack 110 to maintain thermal regulation of the battery cells 120 within the battery pack 110. Thermal regulation of the battery cells 120 can include maintaining each cell 120 or each module 115 within a specific temperature range (e.g., less than 60 degrees Celsius, greater than 0 degrees Celsius, or within another specific temperature range) or maintaining a temperature difference between one or more battery cells 120 or modules 115 within the battery pack 110 to a minimum (e.g., within 5%, within 10%, within 20%, within 50%, etc.). The coolant line 210 or another portion of the system 300 can include at least one radiator or evaporator to release or remove heat from the battery pack 110 (e.g., to release heat from the battery pack 110 to an area that is exterior to the battery pack 110). The coolant line 210 can include at least one air conditioning component to provide cooler temperatures within the cooling. For example, the coolant line 210 can include various types of glycols or polyglycols. The coolant line 210 can include various other types of fluids to facilitate thermoregulation of the battery cells 120.

The coolant line 210 can be or can include at least one physical line (e.g., a fluid conduit, pipe, channel, tube, or the like) to transfer, transmit, or receive a fluid. The fluid can be or can include any substance that is capable of flowing or easily changing shape (e.g., a liquid or gas). The fluid can be or can include any substance that is capable of thermally regulating one or more portions of the battery pack system 300. For example, the fluid can be or can include a solid, liquid, gas, or any combination thereof, that can facilitate maintaining thermal regulation of the battery pack system 300.

The coolant line 210 can include various pipes, tubes, conduits, connectors, or the like to transmit fluid throughout the battery pack 110 to one or more battery modules 115 or another component of the battery pack 110. For example, the coolant line 210 can include at least one pipe, tube, or conduit disposed at least partially within the battery pack 110 (e.g., within the housing 205 of the battery pack 110) to facilitate thermoregulation of the battery modules 115. The coolant line 210 can fluidly couple with at least one fitting (e.g., first fitting 310). The coolant line 210 can fluidly couple to the first fitting 310 such that the coolant line 210 can receive or transmit fluid from a portion internal to (e.g., inside of) the battery pack 110 to a portion that is external to (e.g., outside of) the battery pack 110, or from an external portion to an internal portion.

The first fitting 310 can be or can include any fitting, connector, coupling, or the like to facilitate coupling the coolant line 210 with another component, such as a second fitting 220 or a second fluid line (e.g., a second pipe, tube, conduit, or set of pipes, tubes, or conduits to receive or transmit fluid to or from the first coolant line 210). The first fitting 310 can include a variety of shapes or sizes. For example, the first fitting 310 can have a generally cylindrical, spherical, or rectangular shape, or a variety of combinations of shapes. The first fitting 310 can vary in size to couple with a portion of the first coolant line 210. The coolant line 210 can couple with the first fitting 310 in a variety of ways. For example, the coolant line 210 can include one or more projections 365 to fit over (e.g., clip onto, lock onto) a portion of the first fitting 310 (e.g., such that a portion of the coolant line 210 receives a portion of the first fitting 310). The coolant line 210 can fit within a portion of the first fitting 310 (e.g., such that the first fitting 310 receives a portion of the coolant line 210), as another example. The battery pack system 300 can include one or more components to facilitate fixing the first coolant line 210 with the first fitting 310. For example, the system 300 can include pins, clamps, clips, compression fittings, fasteners, or other coupling elements. The coolant line 210 can include a variety of components to couple with the first fitting 310 such that fluid can flow from the coolant line 210 through the first fitting 310, or from the first fitting 310 through the coolant line 210. For example, the first fitting 310 can be at least partially hollow to receive or transmit the fluid.

The battery pack system 300 can include at least one second fitting 220 to couple with the first fitting 310. The second fitting 220 can be or can include any fitting, connector, coupling, or the like to facilitate coupling the coolant line 210 (e.g., via the first fitting 310) with another component, such as a second fluid line (e.g., a second pipe, tube, conduit, connectors, or set of pipes, tubes, conduits, or connectors to receive or transmit fluid to or from the first coolant line 210). The second fitting 220 can include a variety of shapes or sizes. For example, the second fitting 220 can have a generally cylindrical, spherical, or rectangular, shape, or a variety of combinations of shapes. The second fitting 220 can vary in size to couple with a portion of the first fitting 310.

The first fitting 310 and the second fitting 220 can be made of a variety of materials. For example, the first fitting 310 or the second fitting 220 can be made of various non-metallic materials, such as plastic (e.g., polycarbonate, nylon, or other material). The first fitting 310 or the second fitting 220 can be made of various metallic materials, such as aluminum, as another example. The first fitting 310 or the second fitting 220 can be made of a combination of various metallic and non-metallic materials, as yet another example. The first fitting 310 and the second fitting 220 can be made from the same materials. The first fitting 310 and the second fitting 220 can be made from different materials, as another example.

The first fitting 310 and the second fitting 220 can include a variety of components to couple with the first coolant line 210 such that fluid can flow from the first coolant line 210 through the first fitting 310 and second fitting 220, or from the second fitting 220 through the first fitting 310 and the first coolant line 210. For example, the first fitting 310 and the second fitting 220 can be at least partially hollow to receive or transmit the fluid, as shown in at least FIG. 3.

The first fitting 310 can include a first mating portion 325. For example, the first mating portion 325 can be or can include a female mating portion (e.g., an opening, slot, aperture, or the like to receive a portion of the second fitting 220). The first mating portion 325 can be or can include a male mating portion (e.g., a projection, extension, or other protrusion to penetrate a portion of the second fitting 220). The second fitting 220 can include a second mating portion 330. For example, the second mating portion 330 can complement the first mating portion 325 such that the first mating portion 325 can couple with the second mating portion 330. If the first mating portion 325 is a female mating portion, the second mating portion 330 can be a male mating portion. If the first mating portion 325 is a male mating portion, the second mating portion 330 can be a female mating portion, as another example.

The first mating portion 325 of the first fitting 310 and the second mating portion 330 of the second fitting 220 can be or can include a variety of attachment components to couple the first fitting 310 with the second fitting 220. For example, the first mating portion 325 or the second mating portion 330 can include threads, tabs, fasteners, channels, or the like to couple (e.g., clip together, screw into, snap together) the first fitting 310 and the second fitting 220. As another example, the second mating portion 330 (or the first mating portion 325) can include a pin and the first mating portion 325 (or the second mating portion 330) can include a slot such that the first fitting 310 can receive a portion of the pin of the second fitting 220. The second fitting 220 can rotate relative to the first fitting 310 to slide the pin of the second mating portion 330 into the slot of the first mating portion 325 to lock into place. The slot can include a variety of shapes or sizes to receive the pin. At least one of the first mating portion 325 or the second mating portion 330 can include a nipple feature, as yet another example. For example, the second mating portion 330 can include at least one protrusion that can releasably engage with at least one aperture of the first mating portion 325 such that the second mating portion 330 can releasably couple with the first mating portion. For example, the second mating portion 330 can be removed from the first mating portion in a variety of ways including, but not limited to, applying a force (e.g., pulling or pushing the second fitting 220), rotating the second fitting 220 relative to the first fitting 310, or other means.

The first mating portion 325 can include at least one portion to engage with, or contact, the second mating portion 330. For example, at least one portion of the first mating portion 325 can include a slot, opening, aperture, or the like to receive the second mating portion 330 such that the second mating portion 330 contacts, abuts, or positions adjacent to the first mating portion 325. The first mating portion 325 can include at least one portion that is slightly smaller than a portion of the second mating portion 330 such that the second mating portion 330 engages with the first mating portion 325 (e.g., an outer diameter of the second mating portion 330 can be about equal to an inner diameter of the first mating portion 325 such that the second mating portion 330 contacts the inner diameter of the first mating portion 325 when coupled).

The first fitting 310 can include at least one portion that is internal to the battery pack 110. For example, the first fitting 310 can be entirely positioned within the battery pack 110 (e.g., such that the first fitting 310 is not exposed to an exterior of the battery pack 110 or such that the first fitting 310 is disposed entirely within the housing 205). The first fitting 310 can be partially or entirely positioned outside of the battery pack 110 (e.g., such that all or a portion of the first fitting 310 is exposed to an exterior of the battery back 110), as another example. The first fitting 310 can include a portion that is positioned within the battery pack 110 (e.g., such that at least a portion of the first fitting 310 is not exposed to an exterior of the battery pack 110 or such that at least a portion of the first fitting 310 is disposed within the housing 205), as yet another example.

The first coolant line 210 can be positioned at least partially interior to the battery pack 110. For example, the first coolant line 210 can include at least one conduit, tube, fitting, connector, or the like that is positioned within a portion of the battery pack 110 (e.g., within the housing 205 of the battery pack 110 or adjacent one or more battery modules 115) such that fluid flowing through the first coolant line 210 can flow through an internal portion of the battery pack 110). The first coolant line 210 can be positioned entirely within the battery pack 110 (e.g., such that the first coolant line 210 is not exposed to an exterior of the battery pack 110 or such that the first coolant line 210 is entirely disposed within the housing 205), as another example.

The second fitting 220 can include at least one portion that is external to the battery pack 110. For example, the second fitting 220 can be entirely positioned outside of the battery pack 110 (e.g., such that the entire second fitting 220 is exposed to an exterior of the battery pack 110 or such that the second fitting 220 is disposed entirely outside of the housing 205). The second fitting 220 can include at least a portion that is positioned outside the battery pack 110 (e.g., such that at least a portion of the second fitting 220 is exposed to an exterior of the battery pack 110 or such that at least a portion of the second fitting 220 is disposed outside of the housing 205), as another example.

The second fluid line (e.g., a second tube, conduit, channel, or the like that couples to an end portion 335 of the second fitting 220) can be positioned at least partially outside of the battery pack 110. For example, the second fluid line (represented as end 335) can include at least one conduit, tube, fitting, connector, or the like that is positioned at least partially outside of the battery pack 110 (e.g., exterior to the housing 205 of the battery pack 110) such that fluid flowing through the second fluid line can flow through a portion that is external to or outside of the battery pack 110). The second fluid line can be positioned entirely external to the battery pack 110 (e.g., such that no portion of the second fluid line is positioned or disposed within the housing 205 of the battery pack 110), as another example. The second fluid line can be positioned entirely inside the battery pack 110 (e.g., such that at least a portion of the second fluid line is positioned or disposed within the housing 205 of the battery pack 110), as yet another example.

The first fitting 310 can couple with the second fitting 220 such that fluid can flow from the first fitting 310 to the second fitting 220 (e.g., through the hollow portions of the fittings) or from the second fitting 220 to the first fitting 310. For example, the first fitting 310 can fluidly couple with the second fitting 220. At least one of the first fitting 310 or the second fitting 220 can couple with a portion of the battery pack 110 or with another portion of the battery pack system 300. For example, the first fitting 310 can include one or more portions that contact, or engage, a portion of the battery pack 110 to couple the first fitting 310 with the battery pack 110. The first fitting 310 can include one or more portions along an exterior of the first fitting 310 to engage with a portion of the battery pack 110, such as with an extension 345 of the battery pack 110 (e.g., a molded or casted component of the battery pack housing 205 that engages with the first fitting 310). For example, the extension 345 of the battery pack can engage with a portion of the first fitting 310 to at least partially inhibit movement of the first fitting 310 relative to the battery pack 110.

The second fitting 220 can couple with a portion of the battery pack 110 or with another component of the battery pack system 300. For example, at least one portion of the second fitting 220 can engage with, or contact, the battery pack 110, or another component of the system 300 coupled with the battery pack 110, to at least partially inhibit movement between the second fitting 220 and the battery pack 110. The second fitting 220 can couple with one or more portions of the battery pack 110 through one or more fasteners 350, as an example. The battery pack system 300 can include a various number of fasteners 350 to couple the second fitting 220 with the battery pack 110. For example, two fasteners 350 can couple the second fitting 220 with the battery pack. More or less fasteners 350 can couple the second fitting 220 with the battery pack 110, as another example.

The second fitting 220 can removably couple with the battery pack 110. For example, the second fitting 220 can couple with the battery pack 110 via one or more fasteners, threads, clips, tabs, or the like such that at least a portion of the second fitting 220 can be detached from the battery pack 110 (e.g., via removing the fasteners 350, opening a clip, pulling a tab, unthreading the fitting 220, rotating the fitting 220, pulling the fitting 220, etc.). At least one portion of the second fitting 220 can removably couple with the first fitting 310. For example, the second mating portion 330 of the second fitting 220 can detach from, or be removed from, the first mating portion 325 of the first fitting 310. The second fitting 220 can detach from, or be removed from, the first coolant line 210. For example, the second fitting 220 can detach from one or more portions of the battery pack 110 such that the first coolant line 210 can detach from the second fluid line.

The second fitting 220 can be removed from one or more portions of the system 300 in a variety of ways. For example, the second fitting 220 can be removed from a portion of the system 300 (e.g., the battery pack 110, the battery pack housing 205, the first fitting 310, the first coolant line 210, or the adapter 405 described in greater detail below) by hand. For example, the second fitting 220 can be unthreaded from a portion of the system 300, the second fitting 220 can be pulled or pushed to be removed from a portion of the system 300, or the second fitting 220 can be rotated relative to a portion of the system 300. As another example, the second fitting can be removed from a portion of the system 300 using one or more tools or other equipment. For example, the second fitting 220 can be removed from a portion of the system 300 using one or more machines, hand tools (e.g., screw drivers, wrenches, pliers, or other tools), or other tools or equipment elements.

The second fitting 220 can removably couple with the battery pack 110 or with the first fitting 310 such that the second fitting 220 can be replaced. For example, if the second fitting 220 is not functioning properly (e.g., is damaged, worn, filled with debris, etc.), the second fitting 220 can be removed from the battery pack 110 or from the first fitting 310 and can be replaced with a new second fitting 220 (e.g., that is not damaged, not worn, not filled with debris). The second fitting 220 can removably couple with the battery pack 110 or with the first fitting 310 to access the first fitting 310. For example, the second fitting 220 can be removed from the first fitting 310 to access (e.g., view, inspect, install, remove, replace, etc.) the first fitting 310 that is at least partially internal to the battery pack 110.

The first fitting 310 can have at least one radial seal 315 (referred to as the first radial seal 315). For example, the first radial seal 315 can be or can include any sealing component, such as an O-ring, that seals a portion of the first fitting 310 with a portion of the battery pack 110 or with another portion of the battery pack system 300. The first radial seal 315 can be positioned along an exterior portion of the first fitting 310 such that the first radial seal 315 engages a portion (e.g., a wall 360 of a bore or another portion) of the battery pack 110, as shown in at least FIG. 3. The first radial seal 315 can vary in size or shape and can be positioned along any portion of the first fitting 310. The first radial seal 315 can be made of a variety of metallic or non-metallic materials, such as rubber or metal. For example, the first radial seal 315 can be made from an elastomeric material.

The second fitting 220 can have at least one radial seal 320 (referred to as the second radial seal 320). For example, the second radial seal 320 can be or can include any sealing component, such as an O-ring, that seals a portion of the second fitting 220 with a portion of the battery pack 110 or with another portion of the battery pack system 300. The second radial seal 320 can be positioned along an exterior portion of the second fitting 220 such that the second radial seal 320 engages a portion (e.g., the wall 360 or another portion) of the battery pack 110, as shown in at least FIG. 3. The second radial seal 320 can vary in size or shape and can be positioned along any portion of the second fitting 220. The second radial seal 320 can be made of a variety of metallic or non-metallic materials, such as rubber or metal. For example, the second radial seal 320 can be made from an elastomeric material. The second radial seal 320 can be the same as the first radial seal 315. The second radial seal 320 can at least partially differ from the first radial seal 315, as another example. For example, the second radial seal 320 can include a different diameter than the first radial seal 315.

At least one of the first fitting 310 or the second fitting 220 can have at least one additional seal 340 (referred to as the third radial seal 340). For example, the third radial seal 340 can be or can include any sealing component, such as an O-ring, that seals a portion of the first fitting 310 with a portion of the battery pack 110 or with another portion of the battery pack system 300. The third radial seal 340 can provide an additional level of protection against fluid leaks between the first fitting 310, the second fitting 220, or a portion of the battery pack 110. For example, each of the first radial seal 315, the second radial seal 320, and the third radial seal 340 can vary in at least one of shape or size such that the third radial seal 340 is at least partially redundant. For example, the system 300 may not include the third radial seal 340. As another example, the system 300 can include one or more third radial seals 340. The third radial seal 340 can be positioned along an exterior portion of the first fitting 310 such that the third radial seal 340 engages a portion (e.g., the wall 360 or another portion) of the battery pack 110. The third radial seal 340 can be made of a variety of metallic or non-metallic materials, such as rubber or metal. For example, the third radial seal 340 can be made from an elastomeric material. The third radial seal 340 can vary in size or shape and can be positioned along any portion of the first fitting 310 or the second fitting 220. The third radial seal 340 can be the same (e.g., in size or shape) as the first radial seal 315 or the second radial seal 320. The third radial seal 340 can at least partially differ from at least one of the first radial seal 315 or the second radial seal 320, as another example. For example, the third radial seal 340 can be larger in diameter than the first radial seal 315. The first radial seal 315 can be larger in diameter than the second radial seal 320. As another example, the second radial seal 320 can be larger in diameter than the first radial seal 315. The first radial seal 315 can be larger in diameter than the third radial seal 340. For example, the seals can increase in size in one direction (e.g., from an interior side of the battery pack 110 towards an exterior side of the battery pack 110, from an exterior side of the battery pack 110 towards an interior side of the battery pack 110, or in another direction).

The first radial seal 315 and the second radial seal 320 can engage with the same surface or portion of the battery pack 110 such that the first fitting 310 and the second fitting 220 seal along the same wall 360. For example, the first radial seal 315 and the second radial seal 320 can engage with the wall 360 such that the first fitting 310 and the second fitting 220 form a liquid-tight seal along at least a portion of the wall 360. The third radial seal 340 can engage with the same surface or portion of the battery pack 110 such that each of the first radial seal 315, the second radial seal 320, and the third radial seal 340 engage with the same surface of the battery pack 110 (e.g., the wall 360). At least one of the first radial seal 315, the second radial seal 320, or the third radial seal 340 can engage with separate or distinct surfaces of the battery pack 110 or another portion of the battery pack system 300, as another example. For example, each of the first radial seal 315, the second radial seal 320, and the third radial seal 340 can be unique or can engage with (e.g., contact) separate and distinct portions of the battery pack system 300.

The first fitting 310 and the second fitting 220 can couple with the battery pack 110 in a liquid-tight manner. For example, the first radial seal 315, second radial seal 320, or third radial seal 340 can facilitate compressing the first fitting 310 and the second fitting 220 with a portion of the battery pack 110 such that no liquid can pass from an inside of the first fitting 310 or the second fitting 220 (e.g., from within the hollow portions) to an interior portion of the battery pack 110 that is exterior to the first fitting 310 and the second fitting 220. The first radial seal 315, the second radial seal 320, or the third radial seal 340 can facilitate compressing the first fitting 310 and the second fitting 220 with a portion of the battery pack 110 such that no fluid from the fluid lines can pass from an inside of the first fitting 310 or the second fitting 220 (e.g., from within the hollow portions) to an interior portion of the battery pack 110 that is exterior to the first fitting 310 and the second fitting 220, as another example.

At least one outer diameter portion of the first fitting 310 can differ from a second outer diameter portion of the first fitting 310. For example, the first fitting 310 can have a hollow cylindrical shape such that the first fitting 310 has an inner diameter (e.g., adjacent the hollow interior portion) and an outer diameter (e.g., adjacent an exterior portion). The first fitting 310 can have at least one outer diameter that is greater than a second outer diameter. For example, the first fitting 310 can include a smaller outer diameter at a portion of the first fitting 310 that can receive one or more portions of the battery pack system 300, such as a connector 355 that facilitates coupling the first coolant line 210 with the first fitting 310, as shown in at least FIG. 3. For example, the connector 355 can be or can include one or more clamps, clips (e.g., C-clip), nuts, or other elements for coupling the first fitting 310 with another portion of the system 300. The connector 355 can at least partially surround the first fitting 310 in a circumferential direction to compress a portion of the first fitting 310, for example. The first fitting 310 can have a varying outer diameter such that the first fitting 310 includes an exterior geometric profile that at least partially matches an interior profile of a portion of the first coolant line 210, as another example.

The first fitting 310 can include at least one portion that meets or exceeds a thickness threshold to at least partially inhibit bending of the first fitting 310. For example, the first fitting 310 can include at least one portion with a thickness (e.g., difference between the inner diameter and the outer diameter) to prevent bending of the first fitting 310 when a force is applied to the first fitting 310, such as a force from the first coolant line 210 (e.g., in a direction parallel to a flow of fluid within one of both of the fluid lines). According to one example, the first fitting 310 can have a length of about 70-80 mm in an axial direction, an outer diameter of about 25-35 mm, and a thickness ranging from 1.5-3 mm in a direction perpendicular to the axial direction. This example is for illustrative purposes only. The dimensions of the first fitting 310 can be significantly larger or significantly smaller than the dimensions provided in this example. For example, the first fitting 310 can have a length of about 5 mm or about 5 m, an outer diameter of about 0.5 mm or 5 m, or a thickness of about 0.1 mm or 1 m.

The second fitting 220 can include at least one portion that meets or exceeds a thickness threshold to at least partially inhibit bending of the second fitting 220. For example, the second fitting 220 can include at least one portion with a thickness (e.g., difference between the inner diameter and the outer diameter) to prevent bending of the second fitting 220 when a force is applied to the second fitting 220, such as a force from the second fluid line (e.g., in a direction parallel to a flow of fluid within one of both of the fluid lines). According to one example, the second fitting 220 can have a length of about 70-80 mm in an axial direction, an outer diameter of about 25-35 mm, and a thickness ranging from 1.5-10 mm in a direction perpendicular to the axial direction. This example is for illustrative purposes only. The dimensions of the second fitting 220 can be significantly larger or significantly smaller than the dimensions provided in this example. For example, the second fitting 220 can have a length of about 5 mm or about 5 m, an outer diameter of about 0.5 mm or 5 m, or a thickness of about 0.1 mm or 1 m.

At least one outer diameter portion of the second fitting 220 can differ from a second outer diameter portion of the second fitting 220. For example, the second fitting 220 can have a hollow cylindrical shape such that the second fitting 220 has an inner diameter (e.g., adjacent the hollow interior portion) and an outer diameter (e.g., adjacent an exterior portion). The second fitting 220 can have at least one outer diameter that is greater than a second outer diameter. For example, the second fitting 220 can include a smaller outer diameter at a portion of the second fitting 220 that can receive one or more portions of the battery pack system 300, such as a portion of the second fluid line. In other words, the second fitting 220 can have a varying outer diameter such that the second fitting 220 includes an exterior geometric profile that at least partially matches an interior profile of a portion of the second fluid line.

Figure 4:
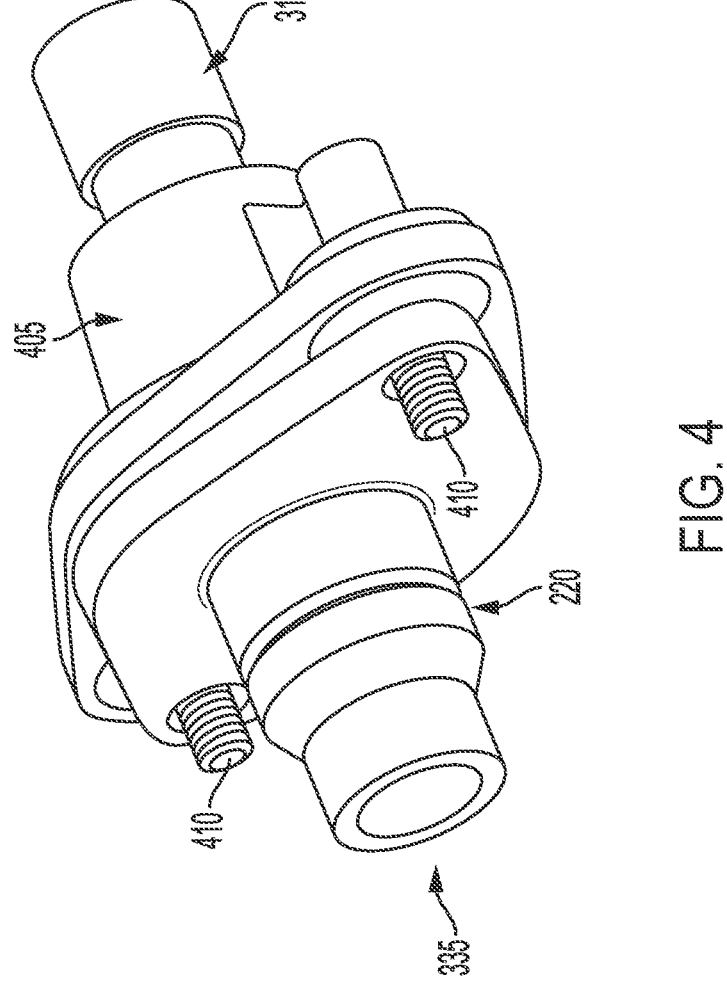
FIG. 4 depicts an example perspective view of a portion of a system, in accordance with implementations.

FIG. 4 depicts a perspective view of a portion of the battery pack system 300. The battery pack system 300 can include at least one adapter 405. For example, the adapter 405 can facilitate coupling the first fitting 310 or the second fitting 220 with the battery pack 110. The adapter 405 can couple with a portion of the battery pack 110 such that the first fitting 310 or the second fitting 220 couple with the adapter 405. The adapter 405 can be made from a variety of materials, including metallic or non-metallic materials. The adapter 405, or at least one portion of the adapter 405, can be formed via casting or molding. For example, the adapter 405 can be formed via casting or molding such that at least one exterior profile of the adapter 405 substantially matches an interior profile of the housing 205 of the battery pack 110.

The adapter 405 can be shaped to match a portion of the profile of the battery pack 110 such that the battery pack 110 can have a variety of shapes and configurations while still having the first fitting 310 and the second fitting 220 to facilitate coupling the first coolant line 210 and the second fluid line. For example, the battery pack 110 may include geometry that is too large or small to couple with the first fitting 310 or the second fitting 220 in a liquid-tight manner. The adapter 405 can be shaped to conform with a portion of the battery pack 110 such that the first fitting 310 or the second fitting 220 can couple to a portion of the adapter 405 in a liquid-tight manner and the adapter 405 can couple with the battery pack 110.

The adapter 405 can include at least one fastener 410 to facilitate coupling the second fitting 220 with the adapter 405. For example, the second fitting 220 can removably couple with the adapter 405 such that the second fitting 220 can be detached, removed, or replaced relative to the adapter 405 and the first fitting 310 coupled with the adapter 405. The fasteners 410 can couple with the adapter 405 in a variety of ways. For example, the fasteners 410 can be molded or formed with the adapter 405 such that the fasteners 410 are fixed with the adapter 405. The fasteners 410 can detachably couple with the adapter 405, as another example.

The adapter 405 can include one or more ribs formed with the adapter 405 (e.g., along an exterior portion of the adapter 405) to facilitate strengthening the structure of the adapter 405. The adapter 405 can include any number of ribs. For example, the adapter 405 can include one rib. The adapter 405 can include two or more ribs, as another example. The adapter 405 can include at least one rib that extends in an axial direction (e.g., substantially parallel to an axial direction of the first fitting 310 or the second fitting 220 when coupled with the adapter 405). The adapter 405 can include at least one rib that extends in another direction relative to the first fitting 310 or the second fitting 220, as another example. The ribs can be made of a variety of materials. For example, the ribs can be made from one or more metallic or plastic materials. The ribs can be formed with the adapter 405 during manufacturing of the adapter 405, as an example.

Figure 5:
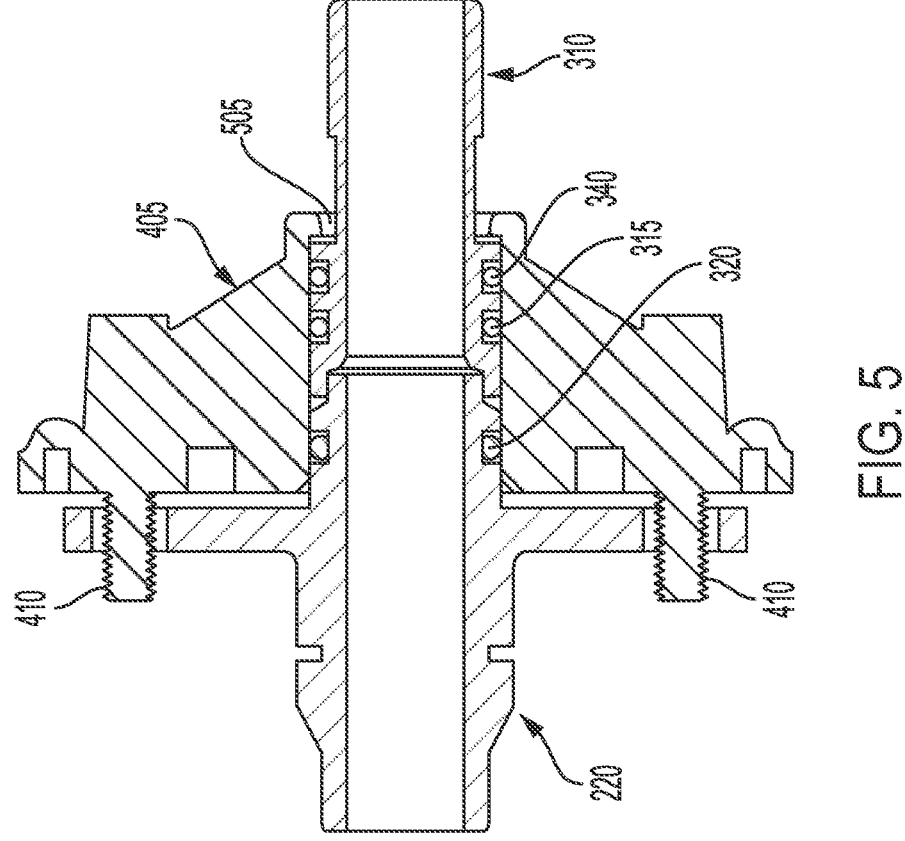
FIG. 5 depicts an example cross-sectional view of the portion of the system of FIG. 4, in accordance with implementations.

FIG. 5 depicts a cross-sectional view of the adapter 405 having the first fitting 310 and the second fitting 220 coupled with the adapter 405. The adapter 405 can include a bore 505 to receive one or more portions of the first fitting 310 or the second fitting 220. For example, the bore 505 of the adapter can include a diameter that is large enough to receive at least one portion of the first fitting 310 (e.g., at a first end of the bore 505) or at least one portion of the second fitting 220 (e.g., at a second end of the bore 505 that opposes the first end). The bore 505 can have one or more features similar to that of the wall 360 of the battery pack 110 shown and described in at least FIG. 3. For example, the first radial seal 315 can seal the first fitting 310 to an inner wall of the bore 505. The second radial seal 320 can seal the second fitting 220 to an inner wall of the bore 505, as another example. The third radial seal 340 can seal the second fitting 220 to an inner wall of the bore 505, as yet another example. The bore 505 of the adapter 405, or another component of the adapter 405, can include one or more fasteners, clips, tabs, projections, or other retention features to inhibit relative movement between the first fitting 310 or the second fitting 220 and the adapter 405.

Figure 6:
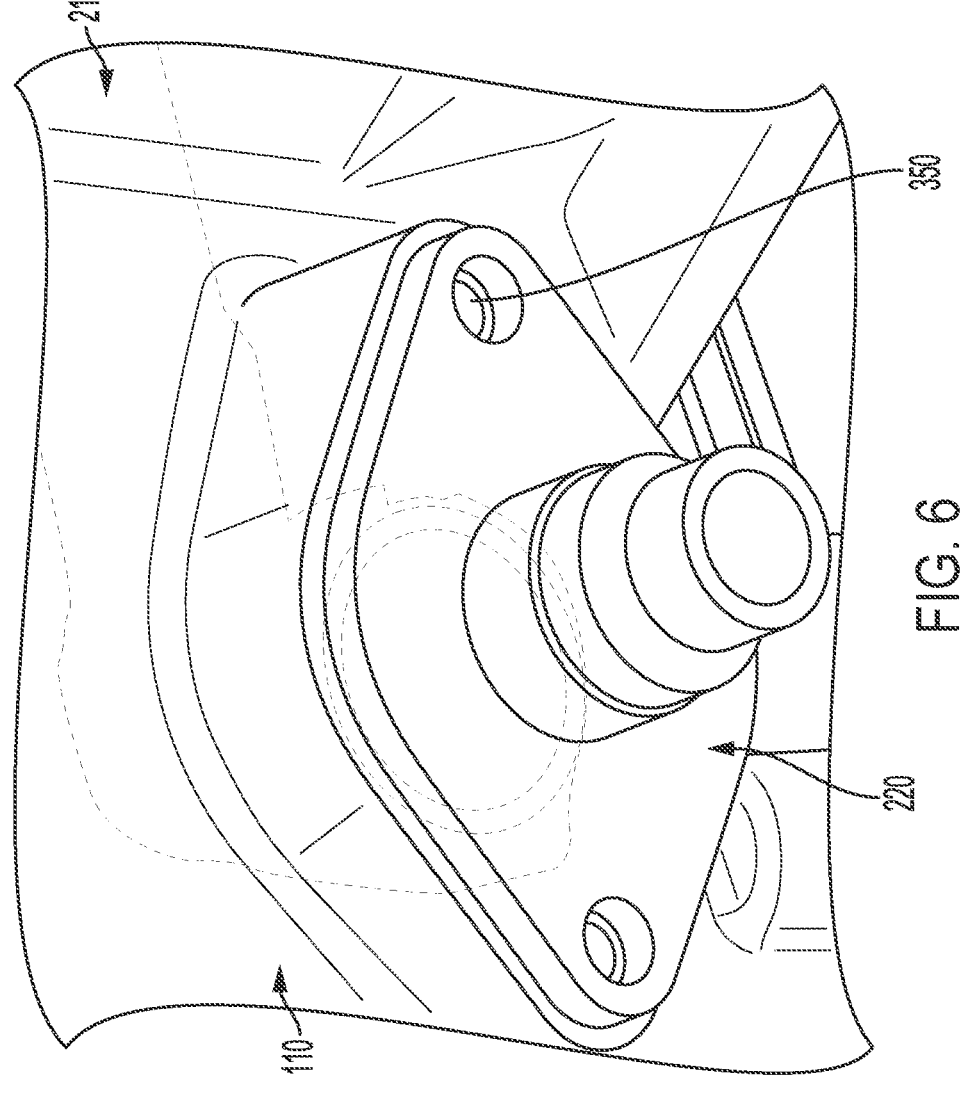
FIG. 6 depicts an example perspective view of a portion of the system of FIG. 3, in accordance with implementations.

FIG. 6 depicts a perspective view of the second fitting 220 coupled with a portion of the battery pack 110. As shown in FIG. 6, and among others, the second fitting 220 can couple with the battery pack 110 such that at least a portion of the second fitting 220 is positioned external to the battery pack 110 (e.g., the second fitting 220 is visible outside of the battery pack 110). As described above, the second fitting 220 can removably couple with the battery pack 110. For example, the second fitting 220 can include at least one feature (shown by fasteners 350) to facilitate removably coupling the second fitting 220 with the battery pack 110. The second fitting 220 can include one or more flanges, projections, extensions, or other elements to facilitate removably coupling the second fitting 220 with the battery pack 110. For example, a flange of the second fitting 220 can include a hole for receiving a fastener 350 to couple with a corresponding hole of the battery pack 110. The first coolant line 210 is illustrated within the battery pack 110 for illustrative purposes.

Figure 7:
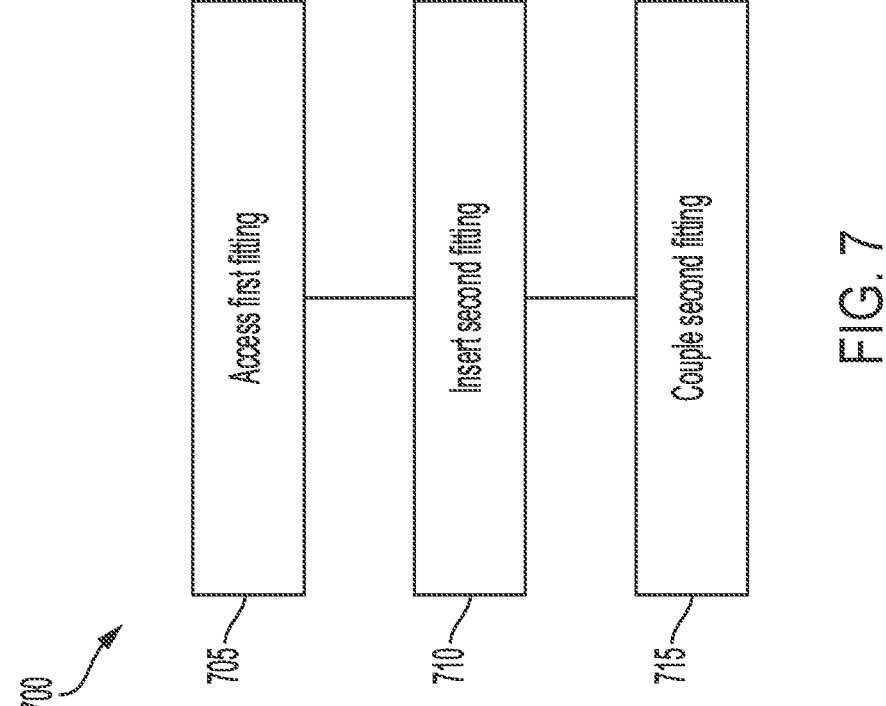
FIG. 7 depicts an example illustration of a process of servicing a fitting assembly, in accordance with implementations.

FIG. 7 illustrates an example method 700 of servicing a fitting assembly or apparatus (e.g., at least one of the first fitting 310, the second fitting 220, the adapter 405, the first coolant line 210, or the second coolant line).

The method 700 can include accessing the first fitting 310, as depicted in act 705. For example, the method 700 can include accessing the first fitting 310 that includes the first mating portion 325. Accessing the first fitting 310 can include coupling the first fitting 310 with the first coolant line 210 that is at least partially internal to the battery pack 110. Accessing the first fitting 310 can include viewing the first fitting 310, coupling the first fitting 310 with one or more portions of the battery pack system 300 (such as with the first coolant line 210 or the bore 505 of the adapter 405) inspecting the first fitting 310, removing the first fitting 310 from the battery pack 110, or replacing the first fitting 310.

The method 700 can include inserting the second fitting 220, as depicted in act 710. For example, the method 700 can include inserting the second fitting 220 into a portion of the first fitting 310. For example, the second mating portion 330 of the second fitting 220 can insert into the first mating portion 325 of the first fitting 310. As another example, the second fitting 220 can receive a portion of the first fitting 310 (e.g., the second mating portion 330 of the second fitting 220 receives the first mating portion 325 of the first fitting 310). The second fitting 220 can insert into one or more portions of the battery pack 110 or the adapter 405 (e.g., into the bore 505 of the adapter 405), as yet another example. The method 700 can include fastening a portion of the second fitting 220 with a portion of the battery pack 110 or a portion of the adapter 405. For example, the second fitting 220 can fasten to the battery pack 110 or the adapter 405 through one or more fasteners, clips, tabs, threads, or the like.

The method 700 can include coupling the second fitting 220, as depicted in act 715. For example, the method 700 can include coupling the second fitting 220 with a second fluid line. The method 700 can include coupling the second fitting 220 with another portion of the battery pack system 300, such as the first fitting 310 or the first coolant line 210, as another example. The second fitting 220 can couple with the second coolant line such that at least one of the second coolant line or the second fitting 220 is at least partially external to the battery pack housing 205.

Figure 8:
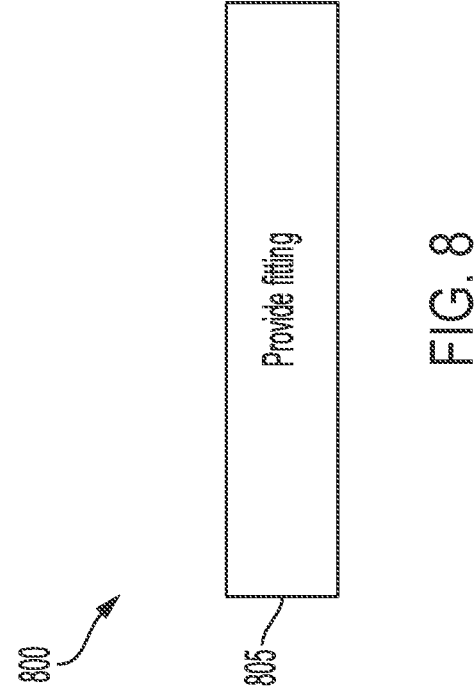
FIG. 8 depicts an example illustration of a process, in accordance with implementations.

FIG. 8 illustrates an example method 800. The method 800 can include providing the second fitting 220, as depicted in act 805. The method 800 can include providing a fitting assembly. For example, the fitting assembly can include at least one of the first fitting 310, the second fitting 220, the battery pack 110, or the adapter 405. The first fitting 310 can couple with a portion of the first coolant line 210 through one or more nipple connectors, snaps, threads, pins, locks, or the like. The first coolant line 210 can include at least one portion (e.g., one portion of a conduit, connector, or the like) that is positioned within the battery pack housing 205. The first fitting 310 can include a first mating portion 325 and the second fitting 220 can include a second mating portion 330. The first mating portion 325 and the second mating portion 330 can complement one another (e.g., the first mating portion 325 can couple with the second mating portion 330). The second fitting 220 can couple with a portion of a second fluid line (a second conduit, connector, or the like) that is positioned at least partially outside of the battery pack 110 structure. The first fitting 310 can fluidly couple with the second fitting 220 such that fluid can flow from the first coolant line 210 through the first fitting 310, through the second fitting 220, and to the second coolant line. Similarly, fluid can flow from the second coolant line through the second fitting 220, through the first fitting 310, and to the first coolant line 210. The second fitting 220 can removably couple with one or more portions of the battery pack system 300 such that the second fitting 220 can be replaced or removed as needed.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure. For example, the fluid lines or fittings described can be configured for use in various other components including, but not limited to, plumbing systems or other piping systems. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a first fitting having a first radial seal and a first mating portion, the first fitting configured to couple with a portion of a first fluid line, the first fluid line at least partially internal to a battery pack, the first fitting configured to couple with a bore of the battery pack, and the first fitting disposed entirely internal to the battery pack;
a second fitting having a second radial seal and a second mating portion, the second fitting configured to couple with a portion of a second fluid line, the second fluid line at least partially external to the battery pack; and
the second mating portion of the second fitting configured to at least partially protrude into and contact the first mating portion of the first fitting within a portion of the battery pack to fluidly couple the first fluid line with the second fluid line,
wherein the second fitting is configured to be removably disengaged from the first fitting with the first fitting remaining coupled to the battery pack.

2. The apparatus of claim 1, comprising:
the first fitting having a third radial seal; and
the first radial seal, the second radial seal, and the third radial seal are configured to form a seal against an inner wall of the battery pack in a liquid-tight manner.

3. The apparatus of claim 1, comprising:
the first fitting including a hollow cylindrical body having an inner diameter, a first outer diameter, and a second outer diameter; and
the first outer diameter is greater than or equal to the second outer diameter.

4. The apparatus of claim 1, comprising:
the second fitting including an external portion positioned external to the battery pack.

5. A battery pack system, comprising:
a fitting assembly, the fitting assembly including:
a first fitting having a first mating portion, the first fitting is configured to couple with a portion of a first fluid line, the first fluid line is at least partially internal to a battery pack, the first fitting having a first radial seal;
a second fitting having a second mating portion, the second fitting is configured to couple with a portion of a second fluid line, the second fluid line is at least partially external to the battery pack, the second fitting having a second radial seal; and
the second mating portion of the second fitting is configured to at least partially protrude into and contact the first mating portion of the first fitting within a portion of the battery pack to fluidly couple the first fluid line with the second fluid line,
wherein the second fitting is configured to be removably disengaged from the first fitting with the first fitting remaining coupled to the battery pack; and
wherein the first radial seal and the second radial seal are configured to form a seal against an inner wall of the battery pack in a liquid-tight manner.

6. The battery pack system of claim 5, comprising:
the first fitting is configured to couple with a bore of the battery pack.

7. The battery pack system of claim 5, comprising:
the first fitting including a hollow cylindrical body having an inner diameter, a first outer diameter, and a second outer diameter; and
the first outer diameter is greater than or equal to the second outer diameter.

8. The battery pack system of claim 5, comprising:
the second fitting including an external portion positioned external to the battery pack.

* * * * *